United States Patent [19]

Hill, Jr.

[11] 3,959,710

[45] May 25, 1976

[54] METHOD FOR EXCITING INDUCTIVE-RESISTIVE LOADS WITH HIGH AND CONTROLLABLE DIRECT CURRENT

[75] Inventor: Homer M. Hill, Jr., Princeton Junction, N.J.

[73] Assignee: The United States of America as represented by the United States Energy Research and Development Administration, Washington, D.C.

[22] Filed: Dec. 31, 1974

[21] Appl. No.: 537,809

[52] U.S. Cl. .................................. 321/9 A; 176/3; 321/18
[51] Int. Cl.² ......................................... H02M 1/12
[58] Field of Search ..................... 321/9 A, 16, 18; 332/10, 64, 66

[56] References Cited
UNITED STATES PATENTS

| | | | |
|---|---|---|---|
| 3,036,273 | 5/1962 | Holbrook et al. .................. | 321/16 X |
| 3,406,328 | 10/1968 | Studtmann ........................ | 321/9 A |
| 3,436,643 | 4/1969 | Castiglione ...................... | 321/9 A |
| 3,624,486 | 11/1971 | Oates ............................. | 321/18 X |
| 3,670,234 | 6/1972 | Joyce ............................. | 321/18 |
| 3,859,586 | 1/1975 | Wadlington ...................... | 321/18 |
| 3,863,140 | 1/1975 | Easter et al. .................... | 321/18 X |

*Primary Examiner*—William M. Shoop
*Attorney, Agent, or Firm*—Dean E. Carlson; Leonard Belkin; Cornell D. Cornish

[57] ABSTRACT

Apparatus and method for transmitting dc power to a load circuit by applying a dc voltage from a standard waveform synthesizer to duration modulate a bipolar rectangular wave generator. As the amplitude of the dc voltage increases, the widths of the rectangular wave generator output pulses increase, and as the amplitude of the dc voltage decreases, the widths of the rectangular wave generator output pulses decrease. Thus, the waveform synthesizer selectively changes the durations of the rectangular wave generator bipolar output pulses so as to produce a rectangular wave ac carrier that is duration modulated in accordance with and in direct proportion to the voltage amplitude from the synthesizer.

Thereupon, by transferring the carrier to the load circuit through an amplifier and a rectifier, the load current also corresponds directly to the voltage amplitude from the synthesizer. To this end, the rectified wave at less than 100% duty factor, amounts to a doubled frequency direct voltage pulse train for applying a direct current to the load, while the current ripple is minimized by a high L/R in the load circuit. In one embodiment, a power transmitting power amplifier means having a dc power supply is matched to the load circuit through a transformer for current magnification without sacrificing load current duration capability, while negative voltage and current feedback are provided in order to insure good output fidelity.

4 Claims, 18 Drawing Figures

3,959,710

METHOD FOR EXCITING INDUCTIVE-RESISTIVE LOADS WITH HIGH AND CONTROLLABLE DIRECT CURRENT

BACKGROUND OF THE DISCLOSURE

This invention was made in the course of or under a contract with the Atomic Energy Commission.

In the field of plasma physics a need exists for a system for supplying a controlled high dc amplitude to an inductive-resistive load circuit. For example, the Princeton University adiabatic toroidal compressor (ATC) which is the Tokamak described in U.S. Pat. No. 3,702,163, has a load circuit formed by a solenoidal field (SF) coil requiring a dc pulse current of up to 2.4 kA or more for up to 30 msec or more. These requirements have been difficult and expensive to meet, since the current supplied by the present hard tube amplifier has been limited to about 2 kA for 20 msec, so that the increased current and time requirements cannot be met without difficulty. On the other hand, a capacitor bank, while conceivably meeting the required current and time, would lack the controllable amplitude requirement. It is also advantageous to provide linear arbitrary amplitude control as well as a long, continuous high dc current amplitude from a high power dc supply means.

SUMMARY OF THE INVENTION

This invention overcomes the problems and shortcomings of the prior art by using tailored, time-duration modulation, wherein a uniform amplitude flat-topped rectangular-wave external ac voltage from a rectangular wave generator produces an ac carrier that is duration modulated by a standard external dc function generator, referred to herein as a waveform synthesizer, in accordance with the amplitude of the dc voltage from the synthesizer, efficiently to provide linear arbitrary amplitude control for selectively providing a continuously variable, and/or a long continuous high dc current amplitude to the load circuit. To this end, the ac carrier is amplified in an amplifier having a dc power source, and a transformer is interposed between the amplifier and the load circuit, while the ac carrier amplitude is maintained constant by voltage feedback from the load circuit.

In one aspect, this invention provides a method for transmitting dc power to a load circuit, comprising the steps of producing a continuously variable dc voltage amplitude from a standard waveform synthesizer, producing a uniform amplitude rectangular wave ac carrier that is duration modulated in accordance with the amplitude change of the dc voltage, amplifying the duration modulated ac carrier with an amplifier having a dc power souce, the amplifier being matched to the resistive part of the load across a transformer, and rectifying the amplified ac carrier with a rectifier for applying the rectified ac carrier to the load circuit as a direct voltage pulse train so that the direct current applied to the load circuit is directly proportional to the average dc voltage amplitude of the pulse train. Current ripple is minimized by the high L/R of the load circuit. Also the heretofore known transformer volt-second problem is overcome because of the ac signal, and this allows the use of a relatively small output transformer for current magnification. Another advantage is that a high efficiency is provided due to the resistive load match between the amplifier and the load. When the high power dc supply is a capacitor energy storage bank, this enables long load current pulses without excessive voltage droop, such droop having been encountered in the banks known heretofore.

In one embodiment, the power transmitting apparatus of this invention is used with a standard continuously variable waveform synthesizer for producing a changing dc voltage amplitude corresponding to a desired load current, further comprising a rectangular wave ac carrier generator means, means consisting of a power transmitting amplifier means having a rectifier for converting the ac carrier to the form of rectified unipolar rectangular pulses with durations in accordance with the changing dc voltage amplitude. In this embodiment, the output amplifier means comprises two push-pull operated tubes that serve to magnify the current pulses from the high power dc supply through the use of a transformer having a secondary that is connected to a rectifier which feeds the inductive-resistive load circuit. Due to the inductance of the inductive-resistive load, the peak amplitudes of the current pulses supplied to the tube plates from the high power dc supply are changed in accordance with the duty factor changes, as is the direct current in the load. Also, current and voltage feedback are provided from the load circuit to the rectangular wave generator and amplifier for more accurate control, when desired.

It is, therefore, an object of this invention to provide an improved high and controllable dc to an inductive-resistive load circuit, such as provided by the solenoidal field coil in the ATC at Princeton University.

BRIEF DESCRIPTION OF THE DRAWINGS

In the drawings, where like elements are referenced alike.

DESCRIPTION OF THE PREFERRED EMBODIMENT

This invention is useful in transmitting a controlled high dc power to an inductive-resistive load circuit, such as the SF solenoid in the ATC at Princeton University described in the above-cited U.S. Patent. For ease of explanation, this specific ATC is referred to hereinafter as a Tokamak. It will be understood, however, that this invention can be used with any of the load circuits to which previously known dc power supply means have been applied.

Figure 1:
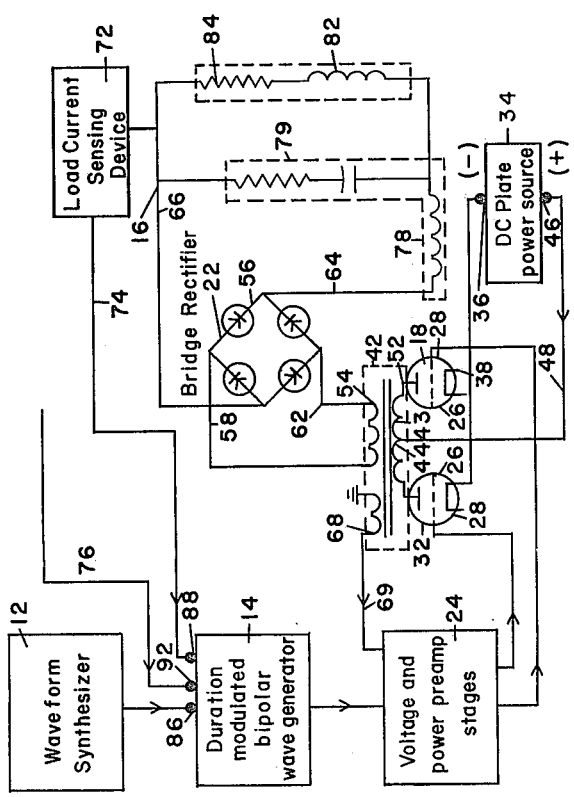
FIG. 1 is a partial schematic view of one preferred embodiment of this invention.
Figure 2:
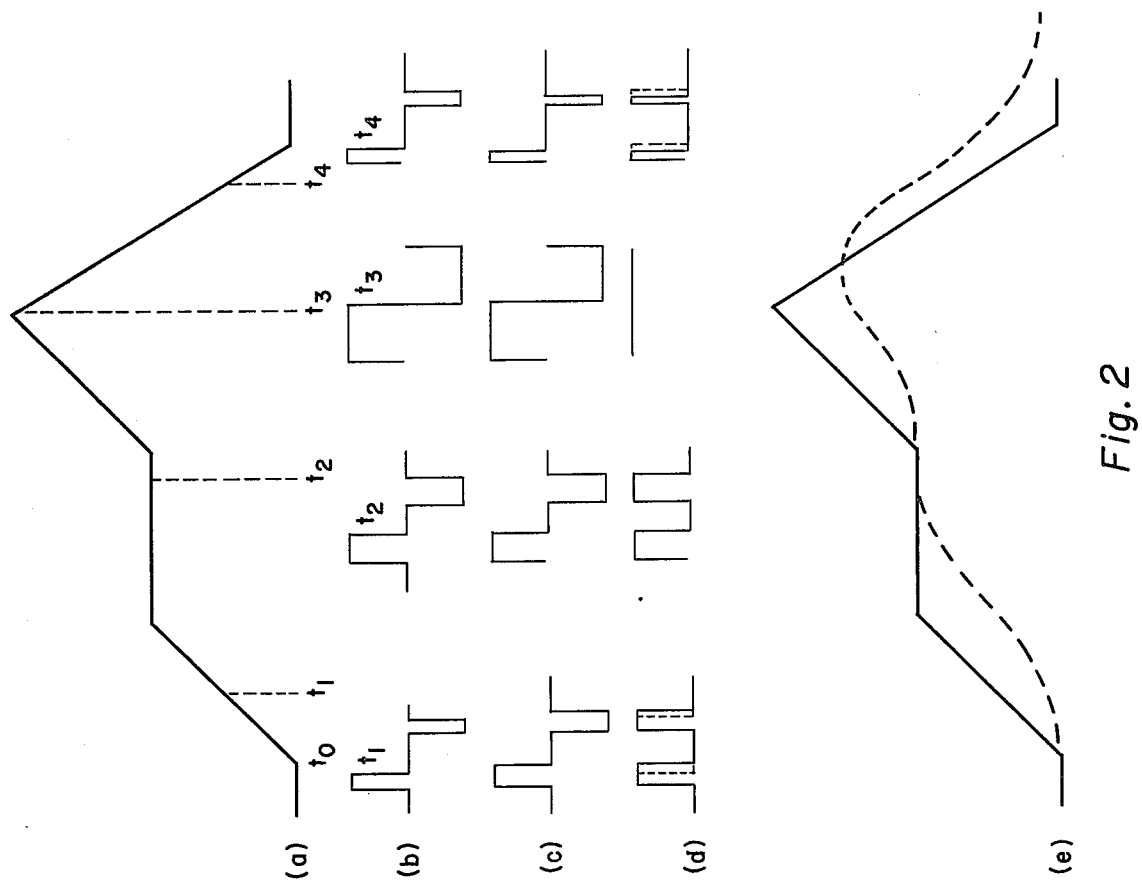
FIGS. 2a–2e show graphic illustrations of the input signal, the carrier duration modulation, and the load current of the apparatus of FIG. 1.

Referring to FIGS. 1 and 2, it is known that a standard waveform synthesizer 12 can apply a predetermined dc voltage waveform to duration modulate a bipolar rectangular wave generator 14. One such synthesizer produces the dc voltage shown in FIG. 2a, where the voltage at time $t_0$ is increasing in amplitude to time $t_1$, is constant at time $t_2$, peaks at time $t_3$, and is decreasing at time $t_4$ toward the initial voltage at time $t_0$. In accordance with this invention, this dc voltage is synthesized to have the same amplitude vs. time characteristic waveform as the desired load current in the described solenoid coil for the above-mentioned tokamak at Princeton University. To this end, the dc voltage from the synthesizer duration modulates a bipolar rectangular wave generator to produce the output illustrated in FIG. 2b at times $t_1$, $t_2$, $t_3$, and $t_4$. As can be seen from the mentioned FIGURES, when the waveform synthesizer output increases from time $t_o$ to time $t_1$, the widths of the rectangular wave generator pulses of FIG. 2b increase from zero to some arbitrary width, while the spacing between the pulses has some arbitrary width, i.e., the rectangular wave pulses provide equal and opposite voltages for predetermined periodic alternating times, and the time period each pulse lasts increases while the time between pulses decreases in direct proportion to the slope and amplitude of the synthesizer waveform. On the other hand, during the flat top period on either side of time $t_2$ in FIGS. 2a and 2b, the rectangular wave generator output pulses have equal pulse widths, which are wider than the corresponding pulse widths at times $t_1$ and $t_4$. Likewise, the pulse widths from time $t_2$ to time $t_3$ increase, while time between pulses decreases. Finally, the rectangular wave generator pulse widths decrease after times $t_3$ and $t_4$, and the time between decreases to time $t_4$ and beyond, until the pulses reach zero width, at which time the synthesizer waveform has zero amplitude and slope as it had initially. As understood from FIG. 2b, the rectangular wave generator pulse widths and times between pulses at times $t_1$ and $t_4$ are about the same, but they are increasing and/or decreasing oppositely respectively. The pulses of FIG. 2b correspond to the waveform of FIG. 2a at times $t_1$, $t_2$, $t_3$, and $t_4$, but these pulses are not affected by negative current feedback. In FIG. 2a the voltage from the waveform synthesizer is applied to duration modulate the rectangular wave generator in the same form as the desired load current. As will be understood in more detail hereinafter, FIG. 2b shows the voltage output from the duration modulated bipolar rectangular wave generator 14 for the case where no current feedback is employed. This rectangular wave is applied to the rectifier bridge 22 of FIG. 1 from the output transformer secondary subsequent to power amplification. A single cycle of the rectangular wave train is shown on an exploded time axis for each of the four time points designated in FIG. 2a. On the other hand, FIG. 2c shows what happens to the pulses of FIG. 2b when negative current feedback is applied from the load circuit 16 to the rectangular wave generator 14 of FIG. 1. In 2c it is seen that the pulse width is increased and the time period between pulses is decreased at time $t_1$, at which point there is an increasing synthesizer dc voltage amplitude in FIG. 2a. Likewise, when the dc voltage amplitude is decreasing in FIG. 2a at time $t_3$, the pulse width is decreased and the time between the pulses increases, as shown in FIG. 2c. Stated another way, for the time samples taken during positive changes in FIG. 2a, the duty factor in FIG. 2c is higher, while for those during negative changes, the duty factor is lower than corresponding pulses in FIG. 2b. It will be understood that FIG. 2c is similar to FIG. 2b, but with negative current feedback applied. FIG. 2d merely illustrates the voltage applied to the load circuit 16 of FIG. 1 (including a filter if used) after amplification in amplifier 18 and rectification in rectifier 22. FIG. 2d, thus illustrates the voltage applied to the load (including filtering if used) after rectification, with the solid line indicating the waveform with negative current feedback, and the dashed line without feedback. As in FIGS. 2b and 2c, the time scale is expanded, whereas FIG. 2e shows the load current on the original time scale, with the solid line indicating the output current with a large amount of negative current feedback and the dashed line with no current feedback. Reference to this figure shows that the load current follows the synthesizer dc voltage in close correspondence when negative current feedback is used.

In understanding how the time modulated rectangular wave is transmitted to the load circuit, reference is again made to FIG. 1, wherein is illustrated the connections of the time modulated rectangular wave generator 14 to the load circuit 16 by a system of amplifiers for transmitting the rectified rectangular wave pulses to the load circuit from the rectangular wave generator in accordance with the changing dc voltage from the synthesizer. As will be understood in the art, the system of amplifiers comprises standard voltage and power preamplifier stages 24 that are connected to the grids 26 of two tubes 28 forming a standard push-pull final power amplifier 32 having a high power dc plate voltage source 34 whose negative terminal 36 is connected to the cathodes 38 of the tubes 28.

The amplifier is matched to the resistive part of the load circuit 16 by an output transformer 42 having a primary winding 43 whose center tap 44 is connected to the positive terminal 46 of the dc plate power source 34 by a lead 48, while the opposite ends of the primary winding 43 are connected to the plates of the tubes 28 by two leads 52. On the output side of the transformer 42, two secondary windings are provided. One of these secondary windings 54 has its opposite ends connected to a bridge rectifier 56 by leads 58 and 62, while the bridge 56 is connected to the load circuit by leads 64 and 66 to complete the connection of the rectangular wave generator 14 to the load circuit 16.

The other secondary winding 68 provides negative voltage feedback through lead 69 from the load circuit to the voltage and power pre-amplifier stages 24 so as to maintain a constant output voltage from the power transmitting power amplifier system.

Negative current feedback is provided in lead 74 from load current sensing device 72 to fine tune the duration modulation of the rectangular wave pulses in accordance with the change of the dc voltage for permitting an increased rate of load current change, enabling closer tracking of the load current with the synthesizer direct voltage function. As mentioned previously, the effect of the feedback on the direct voltage pulse train applied to the load circuit is shown in FIG. 2d where the solid lines represent operation with negative current feedback, and the dashed lines indicate no feedback.

Auxiliary voltages may likewise be supplied to the rectangular wave generator 14 through lead 76 in order to effect a change in load current in response to other parameter(s). If a ripple filter is desired, an inductance 78 and a RC circuit 79 are added to the load circuit 16. Ordinarily, however, the load circuit 16 has a high ratio of inductance to resistance (L/R) which acts to filter out most of the load current ripple. The L and R of the load are illustrated schematically in FIG. 1 by an inductance 82 and a resistance 84. Thus, the rectified wave from the rectifier bridge 56 at less than a 100% duty factor amounts to a doubled frequency direct voltage pulse train and the resulting direct current is applied to the load circuit, ripple in the current being minimized by the high L/R of the load.

Figure 3:
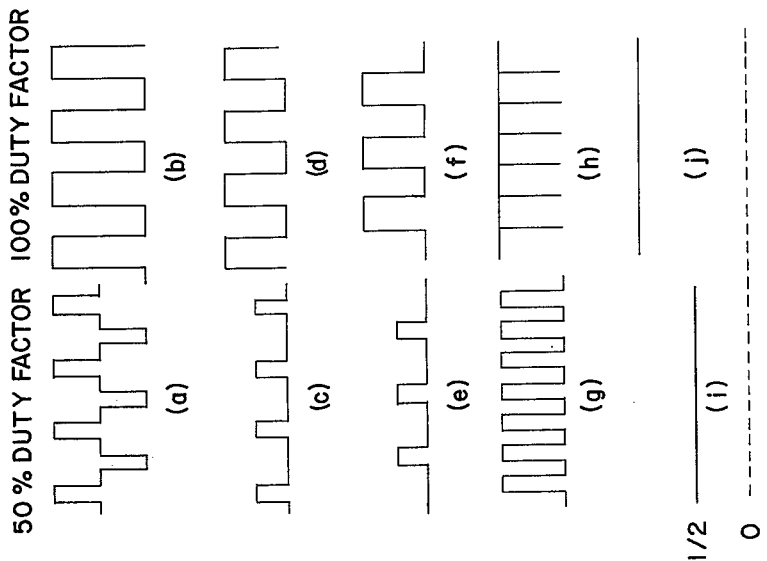
FIGS. 3a–3j are graphic illustrations of waveforms at significant parts of the circuit of FIG. 1.

Circuit waveforms during load current flat top operations are shown in FIGS. 3a through 3j. FIGS. 3a and 3b represent the rectangular wave carrier voltage output from the rectangular wave generator 14. This voltage waveform also exists in amplified replicas throughout the succeeding circuitry up to the bridge rectifier 56. FIGS. 3c and 3d and 3e and 3f illustrate the corresponding total peak plate current waveforms for the opposite push-pull sides of the final power amplifier 32 for the respective 50% and 100% duty factor cases. Likewise, FIGS. 3g and 3h show the corresponding bridge rectifier bridge voltage outputs, while FIGS. 3i and 3j illustrate the flat top current in the load in the load circuit 16, which in this embodiment is formed by the solenoidal field coil in the ATC at Princeton University.

Figure 4A:
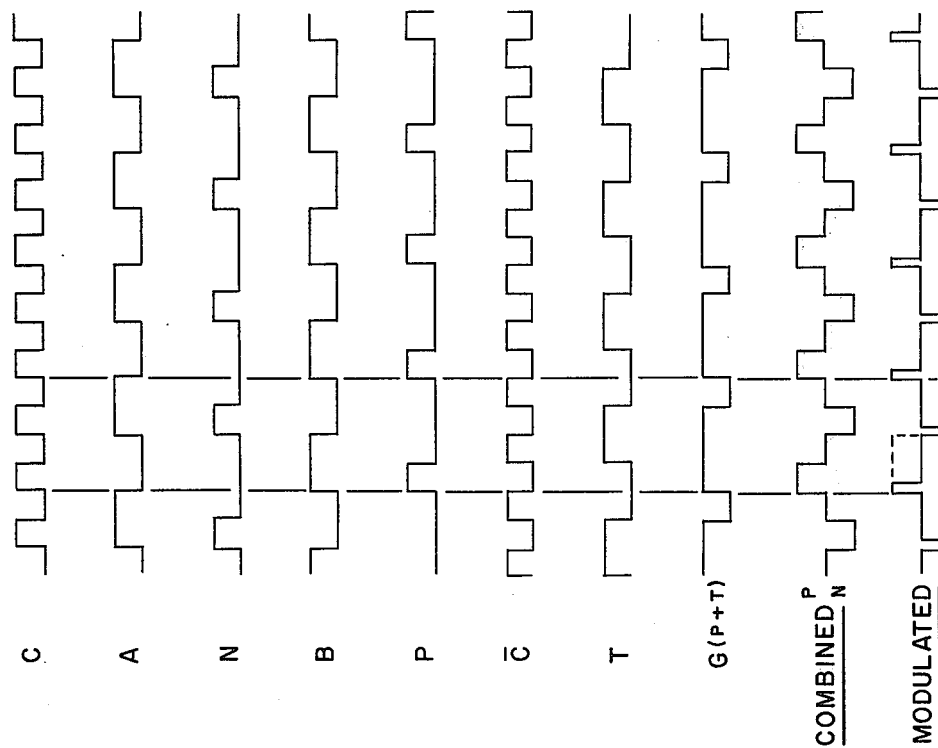
FIG. 4a is a graphic illustration of actual pulses produced at significant parts of the apparatus of FIG. 4.
Figure 4:
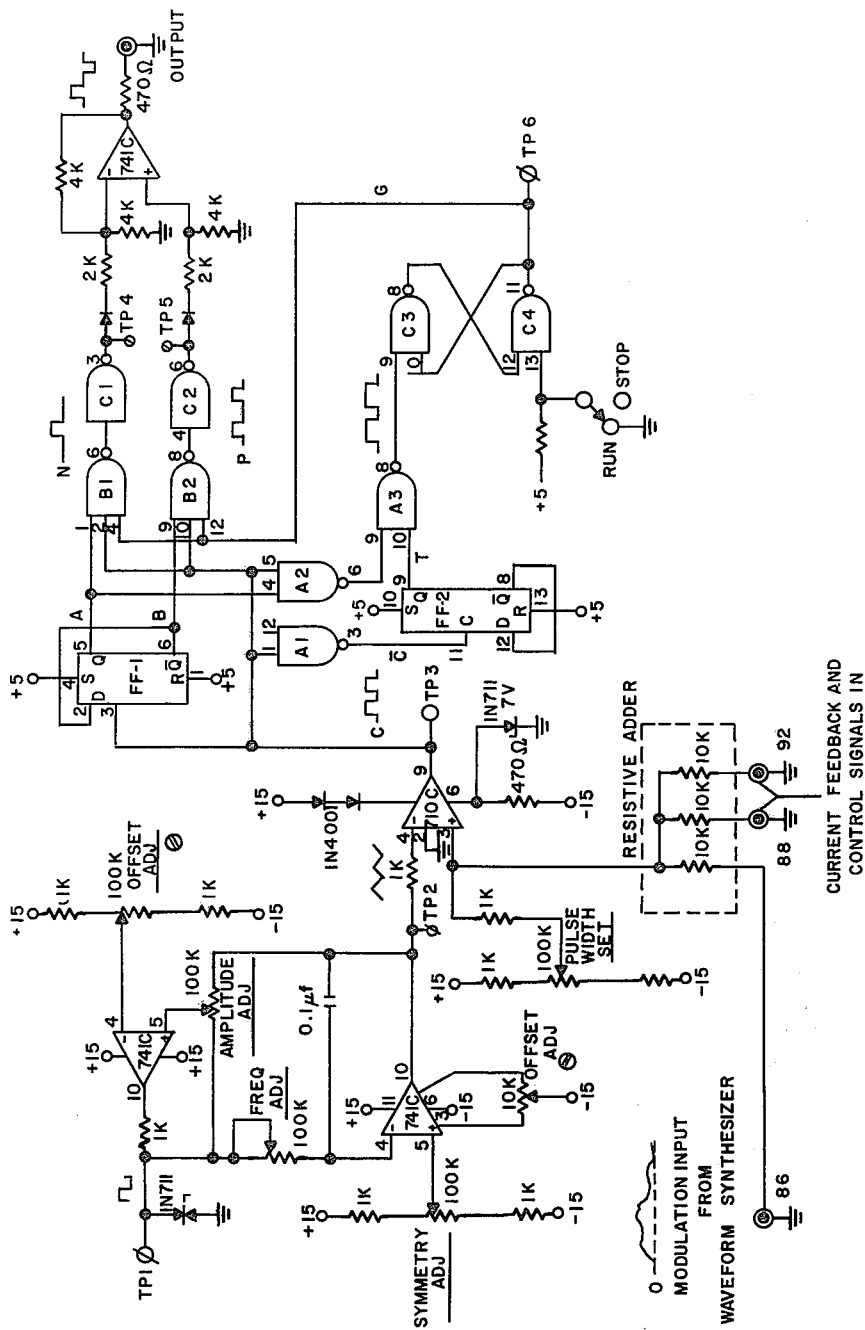
FIG. 4 is a schematic drawing of the duration modulated bipolar rectangular wave generator of FIG. 1.

One embodiment of an actual duration modulated rectangular wave generator 14 is schematically illustrated in FIG. 4, wherein the changing dc voltage input from the waveform synthesizer 12 is shown as being applied in the lower left at junction 86, and the current feedback and auxiliary control signals are illustrated as being applied at junctions 88 and 92, each having a 10,000 ohm resistor as a part of the input adding network. Two offset adjustments, an amplitude adjustment, a frequency adjustment, and a pulse width set control, along with suitable connections, as illustrated and suitable amplifiers which are illustrated as triangles, plus bistable circuits provide the necessary combination to produce the required output waveform. FIG. 4a shows waveforms at key points in the circuitry.

The embodiment of the invention being described employs a duration modulated rectangular wave carrier because of the following advantages: (1) The maximum power output is twice that possible when using a sine wave carrier for the same peak values of voltage and current. (2) The current ripple in the load is lower at maximum output than with sine wave carrier. (3) The amplifier means is operated at higher efficiency that that possible with a sine wave carrier. Furthermore, this high efficiency stays constant at all output levels, whereas with sine carrier the efficiency decreases progressively with lower output levels. (4) Linear modulation can be applied at a low level, unlike the case with amplitude modulation where linearity is difficult to obtain without the use of large and costly components in the higher level stages of amplification. Thus, the duration modulation system using a rectangular wave carrier is less costly than systems using linear amplitude modulation, no matter the carrier waveform. (5) Negative current feedback can be used from the load to the duration modulator without disturbing signal voltage amplitudes in the amplifier proper and having no effect on the amplifier output resistance, which may be kept low by the use of negative voltage feedback from amplifier output to input.

The advantages listed above should not be taken to imply that other carrier waveforms and modulation methods cannot be used, although sacrifices in maximum power out and efficiency must be tolerated in such cases. The ac carrier wave must be symmetric about the time axis in order to prevent a direct current component in any of the system coupling transformers.

As mentioned above, the sine wave carrier maximum output is ½ that for the rectangular wave carrier case. At maximum output the rectangular wave becomes a square wave for the same peak values of plate voltage swing and plate current in the final amplifier tubes 28 as those that would occur with a sine wave. As is well known in the art, the square wave signal voltage and current, having rms values equal to the peak values, produce twice the power that sine wave voltage and current would yield into the same resistive load. The plate input power for sine wave operation, however, is not half that of the square wave power in, but $2/\pi$ of it. Thus, for only ½ the power out, the use of the sine carrier also results in lower efficiency by a factor 0.785. This efficiency is highest at maximum output and becomes progressively lower with decreasing output level.

In operation, the ac carrier signal source is a conventional bi-polar wave generator having a provision for duration modulation of the half-cycles in response to an applied direct voltage that is directly proportional to the load current function desired. This generator advantageously includes inputs for control voltages from other sources, such as the negative current feedback loop from the load circuit 16. This negative current feedback improves linearity markedly as long as the input signal from the dc function generator waveform synthesizer 12 does not ask for changes outside the current vs. time limitations on the circuit and amplifier tube operating parameters. Also, a large amount of such feedback is possible without stability problems. The other input, comprises the dc function generator waveform synthesizer 12 so that the rectangular wave time-duration modulation results from the addition of all the inputs.

The power amplifier system 18, which employs active elements in the control system of this invention, such as transistors or vacuum tubes 28, two of which are shown in FIG. 1, must supply enough real power from the high dc power supply 34 to the load circuit 16 to meet the resistive losses of the circuitry and the resistive losses of the load inductance. The final power amplifier 32 also provides for a negative voltage feedback loop applied from the transformer output, i.e., the beginning of the load circuit, to the first pre-amplifier stage, where the level is relatively low.

The transformer 42 has an adequate iron core and windings to pass the required amplifier output wave form without distortion and with the correct turns ratio to match the amplifier to the resistive part voltages the load. An additional winding is provided for the voltage feedback loop around the main amplifier to the pre-amplifier stages 24. The transformer 42 need not be large because of the alternating signal handled and boosted. This is advantageous over the large transformer required for a long direct current pulse in the systems used heretofore.

The bridge rectifier 22, comprises a conventional rectifying circuit having low-loss diodes capable of passing the load current required. A bridge configuration is advisable for best transformer utilization, although it is not mandatory. Silicon diodes are most suitable.

The portion of the load circuit 16 designated as a filter circuit in FIG. 1, has a relatively low value $L_f$ and values of $C_f$ and $R_f$ for adequate ripple reduction without causing execssive ringing when fast current changes are made. This filter circuit is not required in every application, depending on the value of the load L/R which, in conjunction with the rectangular wave frequency, determines the amount of current ripple with no filter.

One portion of the load circuit 16 may be designated as an isolating means comprising diodes, which are in series with a small isolating inductance. This portion is necessary only where high initial pulse voltages from external sources are required to start or increase current in a conventional manner in less time than in possible using the basic control system alone. The isolating inductance is included to insure cleared diode stored charge prior to inverse application where the desired high voltage pulse is applied in the load circuit 16 during or slightly after conduction of the bridge diodes.

On example of the load is a known specific solenoid having specific requirements in an actual tokamak. The specifications of the high dc power supply 34 correspond therewith for producing the desired controllable direct current. However, the supply 34 can be one of several types. The essential requirement is that it must supply a reasonable direct voltage to the plates of the final power amplifier tubes 28 for the required current duration. Where continuous operation of the load solenoid at high current and power is required in a specific tokamak, as understood from co-pending application Ser. No. 416,902, filed Nov. 14, 1973, a multi-phase 60 hZ rectifying system in a rectifier with little or no filtering in the load circuit can be employed. Also, a push-pull connection for the last stage of the final power amplifier 32 and the inclusion of a negative voltage feedback loop reduce the line ripple effect on the output to the load circuit to a neglible amount. The case where long pulse but not continuous operation is required may be satisfied in some applications understood in the art at less cost by using capacitor banks or line storage systems for the high dc power supply means 34.

Referring again to the basic duration modulated rectangular wave shown in the figures, the waveform synthesizer 12 applies the required load current versus time function to the input adding network of generator 14 in FIG. 4. This signal is transformed to a constant amplitude alternating rectangular wave voltage having the durations of the half-cycles thereof modulated in accordance with the input signal variations. To this end, the rectangular wave frequency is chosen such that the bipolar halves of a period are not of unequal duration. In most cases, there is no reason for this to happen, as the load prevents exceptionally high rates of change and the input function will not include the same.

Table II shows the performance of the basic system of this invention. The first column shows design parameters for a current of 2.5 kA in the solenoid field during the flattop. Performances at maximum output in the second column is shown as reference only and is not required in practice. Table I shows the heretofore known system parameters.

While the above has described and primarily relates to a matched system, wherein the amplifier is matched to the load across the transformer by choosing the correct turns ratio, it will be understood that this invention could be modified to provide a mismatch across the transformer in a direction for achieving more voltage for a faster load current change when required. It is recognized, however, that a decrease in maximum power output would result in this case, which trades power output for faster load current amplitude changes.

The following is an example of a bench test on a scaled down model of this invention:

EXAMPLE I

Tests made on 100 W system show that performance is similar in all respects to that predicted for the larger system contemplated by Table II. Using an Exact Electronics, Inc. Model 202 analog variable slope waveform synthesizer to duration modulate the square wave generator shown in the drawings, the desired selectively changeable, long duration pulse shape is produced, and rise time with feedback is reduced by a factor of five or more to give substantially distortionless results.

By adjusting the modulation time duration, the current is selectively changed up to 10% or more. A fundamental square wave frequency of 1kHz is used in this example with a duty factor that is selectively and continuously variable from 0–100%.

This invention has the advantage of providing a high and controllable dc to an inductive-resistive load circuit, such as provided by the field coil in the ATC at Princeton University.

TABLE I

Heretofore known system performance

| Item | Specifications Original | Revised |
|---|---|---|
| Flattop SF Current | 2 kA | 2.4 kA |
| Bank Supply Voltage | 5 kV | 5 kV |
| Peak Plate Current per Tube | 167 A | 200 A |
| Total Peak Tube and SF Current | 2 kA | 2.4 kA |
| Amplifier Peak Power Output | 631 kW | 908 kW |
| Peak Power in SF Coil Resistance | 296 kW | 426 kW |
| Peak Power in Circuit Losses | 335 kW | 482 kW |
| Peak Power in Tube Anodes | 6.2 MW | 8.9 MW |
| Peak Power from Storage Bank | 6.8 MW | 9.8 MW |
| Amplifier Plate Efficiency | 9% | 9% |
| Maximum Pulse Duration | 48 msec | 27 msec |
| Time for +10% Current Change | 0.2 msec | No change is possible |
| Time for −10% Current Change | 0.2 msec | 0.2 msec |

TABLE II

Performance of the system of this Invention

| Item | Design Center | Maximum Rating |
|---|---|---|
| Flattop SF Current | kA | 5 kA |
| Bank Supply Voltage | 5 kV | 5 kV |
| Square Wave Duty Factor | 47.4% | 100% |
| Square Wave Fundamental Frequency | 1 kHz | 1 kHz |
| Peak Plate Current per Tube | 63 A | 133 A |
| Peak Plate Current from all Tubes | 379 A | 800 A |
| Amplifier Peak Power Output | 535 kW | 2.27 MW |
| Peak Power in SF Coil Resistance | 463 kW | 1.85 MW |
| Peak Power in Circuit Losses | 72 kW | 417 kW |
| Peak Power in Tube Anodes | 314 kW | 1.5 MW |
| Peak Power from Storage Bank | 848 kW | 3.77 MW |
| Maximum Flattop Current Duration | 113 msec | 26 msec |
| Amplifier Plate Efficiency | 63% | 60% |
| Time for +10% Current Change | 3.6 msec | Not required |
| Time for −10% Current Change | 3.6 msec | 3.6 msec |
| Peak to Peak Current Ripple | 0.16% | negligible |

What is claimed is:

1. Power transmitting apparatus for the use with a waveform synthesizer source of a changing dc voltage amplitude corresponding to a desired load circuit current, comprising:
   a. load circuit means;
   b. rectangular wave ac carrier generator means;
   c. power transmitting push-pull amplifier means having a transformer characterized by a predetermined turns ratio and a rectifier for transmitting the ac carrier in the form of rectified rectangular wave pulses to the load circuit means from the rectangular wave generator; and d. means for duration modulating the ac carrier to effect the transmission of the rectified rectangular wave pulses to the load circuit means in accordance with the changing dc voltage amplitude;

e. the power transmitting push-pull amplifier means being matched to the resistive part of the load circuit means by the turns ratio of the transformer.

2. The apparatus of claim 1 in which the transformer has a primary winding and two secondary windings, one of which is connected to the rectifier and the other of which is connected to the amplifier input to form a negative feedback loop for maintaining a constant voltage amplifier output.

3. The apparatus of claim 1 having current feedback from the load circuit back to the duration modulated rectangular wave ac carrier generator means.

4. The apparatus of claim 2 having current feedback means connected from the load circuit back to duration modulate the rectangular wave ac generator means so that the load current closely follows the dc voltage amplitude waveform.

* * * * *